United States Patent
Schuhn et al.

(10) Patent No.: US 12,085,545 B2
(45) Date of Patent: Sep. 10, 2024

(54) ADJUSTING SEPARATION METHOD USING SENSOR DATA AND NUMERICAL ANALYSIS

(71) Applicant: Agilent Technologies, Inc., Santa Clara, CA (US)

(72) Inventors: Bettina Schuhn, Karlsruhe (DE); Uwe Effelsberg, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 703 days.

(21) Appl. No.: 17/215,872

(22) Filed: Mar. 29, 2021

(65) Prior Publication Data

US 2021/0302399 A1  Sep. 30, 2021

(30) Foreign Application Priority Data

Mar. 30, 2020 (GB) .................................. 2004572.0

(51) Int. Cl.
*G01N 30/86* (2006.01)
*G01N 30/16* (2006.01)
*G01N 30/02* (2006.01)

(52) U.S. Cl.
CPC ......... *G01N 30/8658* (2013.01); *G01N 30/16* (2013.01); *G01N 2030/027* (2013.01)

(58) Field of Classification Search
CPC ............... G01N 30/8658; G01N 30/16; G01N 2030/027; G01N 30/86
See application file for complete search history.

(56) References Cited

U.S. PATENT DOCUMENTS

2004/0253147 A1  12/2004  Golushko
2015/0122655 A1*  5/2015  Choikhet ............. G01N 30/465
                                                                        204/600

FOREIGN PATENT DOCUMENTS

EP      0359320 A2    3/1990
WO      0177662 A2   10/2001

OTHER PUBLICATIONS

Wolcott, R G., et al, "Computer Simulation for the Convenient Optimization of Isocratic Reversed-Phase Liquid Chromatographic Separations by Varying Temperature and Mobile Phase Strength," Journal of Chromatography A, vol. 869 (1-2), 2000, pp. 3-25.

* cited by examiner

*Primary Examiner* — Manuel A Rivera Vargas

(57) ABSTRACT

A process of determining a modified separation method for a sample separation apparatus based on an initial separation method, including carrying out the initial separation method on a sample separation apparatus, detecting sensor data at the sample separation apparatus during carrying out the initial separation method, and carrying out a numerical analysis for determining the modified separation method by modifying at least one operation parameter of the initial separation method and by using the detected sensor data.

18 Claims, 2 Drawing Sheets

ADJUSTING SEPARATION METHOD USING SENSOR DATA AND NUMERICAL ANALYSIS

RELATED APPLICATIONS

This application claims priority to UK Application No. GB 2004572.0, filed Mar. 30, 2020, the entire contents of which are incorporated herein by reference.

TECHNICAL FIELD

The present invention relates to a process of and a device for determining a modified separation method for a sample separation apparatus based on an initial separation method, an arrangement, a program element and a computer readable medium.

BACKGROUND ART

Fluidic devices are applied to execute various measurement tasks in order to measure any kind of physical parameter. Each fluidic device may have a specific driver with device specific commands. A programming software allows a user to design an operation mode of the fluidic device. As a result of such a design, the fluidic device may be operated in accordance with the designed operation mode.

More particularly, in liquid chromatography, a fluidic analyte may be pumped through a column comprising a material which is capable of separating different components of the fluidic analyte. Such a material, so-called beads, may be filled into a column tube which may be connected to other elements (like a control unit, containers including sample and/or buffers). Upstream of a column, the fluidic sample or analyte is loaded into the liquid chromatography apparatus. A controller controls an amount of fluid to be pumped through the liquid chromatography apparatus, including controlling a composition and time-dependency of a solvent interacting with the fluidic analyte. Such a solvent may be a mixture of different constituents. The supply of these constituents for subsequent mixing is an example of an operation to be designed by an operator of a liquid chromatography device.

However, developing a sample separation method, in particular a chromatographic method, may be cumbersome.

SUMMARY

It is an object of the invention to simplify development of a powerful separation method for a sample separation apparatus.

According to an exemplary embodiment, a process of determining a modified separation method for a sample separation apparatus based on an initial separation method is provided, wherein the process comprises carrying out the initial separation method on a sample separation apparatus, detecting sensor data at the sample separation apparatus during carrying out the initial separation method, and carrying out a numerical analysis for determining the modified separation method by modifying at least one operation parameter of the initial separation method and by using the detected sensor data.

According to another exemplary embodiment, a device for determining a modified separation method for a sample separation apparatus based on an initial separation method is provided, wherein the device comprises a control unit for carrying out the initial separation method on a sample separation apparatus, one or more sensors for detecting sensor data at the sample separation apparatus (in particular at a separation path thereof, along which mobile phase and fluidic sample flow during a separation) during carrying out the initial separation method, and a numerical analysis unit for carrying out a numerical analysis for determining the modified separation method by modifying at least one operation parameter of the initial separation method and by using the detected sensor data (in particular using the detected sensor data for the numerical analysis).

According to yet another exemplary embodiment, an arrangement is provided which comprises a sample separation apparatus for separating a fluidic sample, wherein the sample separation apparatus comprises a fluid drive for driving a mobile phase and the fluidic sample when injected in the mobile phase, a sample separation unit for separating the fluidic sample in the mobile phase, and a control unit configured for controlling the separation of the fluidic sample based on a given separation method, wherein the arrangement further comprises a device having the above-mentioned features for determining a modified separation method based on an initial separation method and for providing the modified separation method to the sample separation apparatus as the given separation method (and therefore for instance for execution on the sample separation apparatus).

According to still another exemplary embodiment of the invention, a program element (for instance a software routine, in source code or in executable code) is provided, which, when being executed by a processor (such as a microprocessor or a CPU), is adapted to control or carry out a method having the above mentioned features.

According to yet another exemplary embodiment of the invention, a computer-readable medium (for instance a CD, a DVD, a USB stick, a floppy disk or a hard disk) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

In the context of the present application, the term "sample separation apparatus" may particularly denote any apparatus which involves the transport, analysis or processing of fluids for separation of a fluidic sample. A fluid may denote a liquid, a gas or a combination of a liquid and a gas, and may optionally also include solid particles, for instance forming a gel or an emulsion. Such a fluid may comprise a mobile phase (such as a fluidic solvent or solvent composition) and/or a fluidic sample under analysis. Examples for sample separation apparatuses are chemical analysis devices, life science apparatuses or any other biochemical analysis system such as a separation device for separating different components of a sample, particularly a liquid chromatography device. For example, the sample separation can be done by chromatography or electrophoresis.

In the context of the present application, the term "separation method" may particularly denote an instruction for a sample separation apparatus as to how to separate a fluidic sample, which is to be carried out by the sample separation apparatus in order to fulfill a separation task associated with the separation method. Such a separation method can be defined by a set of parameter values (for example temperature, pressure, characteristic of a solvent composition, etc.)

and hardware components of the sample separation apparatus (for example the type of separation column used) and an algorithm with processes that are executed when the separation method is performed. A corresponding set of technical parameters for operating the sample separation apparatus during sample separation may be pre-known, for instance stored in a database or memory accessible by a control unit controlling operation of the sample separation apparatus. Physical properties or operation parameters characterizing a separation method may involve a transport characteristic which may include parameters such as volumes, dimensions, values of physical parameters such as pressure or temperature, and/or physical effects such as a model of friction occurring in a fluidic conduit which friction effects may be modeled, for example, according to the Hagen Poiseuille law. More particularly, the parameterization may consider dimensions of a sample separation apparatus (for instance a dimension of a fluidic channel), a volume of a fluid conduit (such as a dead volume) of the sample separation apparatus, a pump performance (such as the pump power and/or pump capacity) of the sample separation apparatus, a delay parameter (such as a delay time after switching on a sample separation apparatus) of operating the sample separation apparatus, a friction parameter (for instance characterizing friction between a wall of a fluidic conduit and a fluid flowing through the conduit) of operating the sample separation apparatus, a flush performance (particularly properties related to rinsing or flushing the sample separation apparatus before operating it or between two subsequent operations) of the sample separation apparatus, and/or a cooperation of different components of the sample separation apparatus (for instance the properties of a gradient applied to a chromatographic column).

In the context of the present application, the term "initial separation method" of the sample separation apparatus may particularly denote a separation method used as a starting point for determining a modified (in particular improved) separation method having more desired properties for a sample separation apparatus. For instance, the initial separation method may be a pre-known or pre-developed method. It is possible that the initial separation method is taken or even selected from a method database comprising multiple usable separation methods. Such a selection may for instance be based on a user-defined target specification defining characteristics of a sample separation task which a user wants to carry out using a simple separation apparatus In the context of the present application, the term "modified separation method" of the sample separation apparatus may particularly denote a separation method developed based on an initial separation method (and preferably using additional information, in particular sensor data from one or more method development sensors arranged along a separation path of a sample separation apparatus) and improving the characteristic (for instance performance, throughput, separation accuracy, etc.) of sample separation when carried out on a sample separation apparatus.

In the context of the present application, the term "fluidic sample" may particularly denote a medium containing the matter which is actually analyzed (for example a biological sample, such as a protein solution, a pharmaceutical sample, etc.).

In the context of the present application, the term "mobile phase" may particularly denote a fluid (in particular a liquid) which serves as a carrier medium for transporting a fluidic sample from a fluid drive (such as a high pressure pump) to a sample separation unit (such as a chromatographic column) of a sample separation apparatus. For example, the mobile phase may be a (for example, organic and/or inorganic) solvent or a solvent composition (for example, water and ethanol).

In the context of the present application, the term "numerical analysis" may particularly denote algorithmic methods that use numerical approximation and/or algorithms for problems of mathematical analysis. A goal of numerical analysis when applied to separation method development is the design and analysis of techniques to give approximate but accurate solutions to hard problems relating to the development of a separation method. Numerical analysis may create, analyze and/or implement algorithms for obtaining numerical solutions to method development related problems involving continuous variables.

In the context of the present application, the term "operation parameter" may particularly denote a parameter of a set of multiple parameters defining a respective separation method and describing a property adjusted or occurring during operation of a sample separation apparatus when executing a separation method. Such operation parameters can include in particular a physical separation condition (in particular pressure and/or temperature, for instance at a sample separation unit such as a chromatographic column, a wavelength of a detector, integration parameters, etc.), a used sample separation apparatus (including a type of sample separation apparatus, for instance chromatographic or electrophoretic, a sample separation apparatus model, etc.), etc.

According to an exemplary embodiment of the invention, development of a separation method for separating a sample by a sample separation apparatus may be carried out with an actual execution of an initial separation method (in particular a gradient measurement) on the sample separation apparatus. An experimental result of such an execution may then be further analyzed by a numerical analysis (such as a finite element simulation). In this context, one or more operation parameters of the initial separation method may be changed or modified or adapted for improving the initial separation method in accordance with a specific sample separation apparatus and/or sample separation task to thereby obtain an improved modified separation method. Highly advantageously, sensor data sensed on the sample separation apparatus during executing the initial separation method may be considered in this numerical analysis-based method development process. By taking this measure, a modified separation method may be obtained which really fits properly to the needs of a specific sample separation apparatus and/or the needs of a specific sample separation application. In particular, a developed modified separation method may take into account the specific characteristics and individual properties of the sample separation apparatus which are reflected by the actual results of executing the initial separation method on the sample separation apparatus and which are reflected by the sensor data. Thus, a meaningful and device-specific modification of the separation method may be achieved with a specific focus on the particularities of a specific sample separation apparatus.

Next, further exemplary embodiments of the process, the device, the arrangement, the program element and the computer readable medium will be explained.

In an embodiment, the process comprises carrying out the numerical analysis using, in addition, a result of carrying out the initial separation method. For the example of a chromatographic separation, a chromatogram obtained from carrying out the initial separation method may be used for the numerical analysis. By taking this measure, the actual or real behavior of a sample separation apparatus (for which the separation method shall be developed or modified) may be taken into account. Due to the individual particularities of such a sample separation apparatus, the sample separation apparatus may behave, in practice or reality, differently from a target behavior as defined by a target separation method. By taking into account such individual particularities which are reflected by the separation result obtained when carrying out the initial separation method, the modified separation method may be adjusted so as to deliver a desired separation behavior or result specifically on the target sample separation apparatus. One or more device-specific properties of a sample separation apparatus may be properties which are individual for a very specific sample separation apparatus due to its device-specific tolerances, device-specific artifacts, device-specific operating conditions or other individual characteristics. For example, such device-specific properties may be a delay volume of mobile phase, which delay volume must flow through the sample separation apparatus until an adjustable solvent composition is actually achieved. Also an actual mixing behavior (which may deviate from a desired target behavior) of a proportioning valve for mixing several components of a mobile phase may be such a device-specific property. Also an intrinsic inaccuracy of a composition of a mobile phase due to the intrinsic properties of an individual sample separation apparatus can be such a device-specific property. Furthermore, a leakage behavior of a sample separation apparatus may be such a device-specific property which can be taken into account according to an embodiment of the invention.

In an embodiment, the process comprises detecting sensor data indicative of a flow rate, a composition, a temperature and/or a pressure of a mobile phase and/or a fluidic sample flowing through the sample separation apparatus during carrying out the initial separation method on the sample separation apparatus. More specifically, one or more method development sensors may be configured to measure a gradient of flow and composition during analysis. Thus, a flow rate sensor, a solvent composition determination sensor, a temperature sensor, a pressure sensor, etc. may be implemented in the separation path as method development sensor(s) according to an exemplary embodiment of the invention. For instance, a Coriolis sensor and/or a thermal flow sensor may be implemented as method development sensor.

For instance, such a Coriolis sensor may operate as a Coriolis flow meter through which fluid may be pumped. When there is mass flow, a tube twists slightly. An arm through which fluid flows away from an axis of rotation will exert a force on the fluid, to increase its angular momentum, so it bends backwards. The arm through which fluid is pushed back to the axis of rotation will exert a force on the fluid to decrease the fluid's angular momentum again, hence that arm will bend forward. In other words, the inlet arm (containing an outwards directed flow), is lagging behind the overall rotation, the part which in rest is parallel to the axis is now skewed, and the outlet arm (containing an inwards directed flow) leads the overall rotation. This tube twisting allows for a measurement of the mass flow rate. An example for a usable Coriolis sensor is the Cori-Flow® sensor commercialized by Bronkhorst High-Tech B.V., A K Ruurlo, The Netherlands, or density sensors commercialized by TrueDyne Sensors AG, Reinach, Switzerland.

Also thermal flow sensors like flow sensors commercialized by Sensirion AG, Staefa, Switzerland, may be implemented. Thermal mass flow meters may be used for the measurement of the total mass flow rate of a fluid flowing through closed conduits. Another type is a capillary-tube type of thermal mass flow meter. Both types may measure fluid mass flow rate by heat convected from a heated surface to flowing fluid.

Other sensors, which may be advantageously implemented for method development are combined sensors for flow and other fluid properties.

In an embodiment, the process comprises detecting sensor data by at least one sensor located upstream of a sample separation unit of the sample separation apparatus. More specifically, the at least one sensor may be located between a fluid drive for driving a mobile phase and an injector for injecting the fluidic sample in the mobile phase, or between an injector for injecting the fluidic sample in the mobile phase and the sample separation unit. In other words, the at least one method development sensor may be arranged preferably in a separation path downstream of or at a fluid drive (such as a chromatographic high-pressure pump) and upstream of or at a sample separation unit (such as a chromatographic separation column). In this spatial range of installation, the separation-specific properties of the sample separation apparatus may be detected by the at least one method development sensor.

In an embodiment, the process comprises carrying out the numerical analysis using at least one of the group consisting of a finite element method (FEM) analysis, a finite difference method (FDM) analysis, a boundary element method (BEM) analysis, a control volume method (CVM) analysis, and a random walk method analysis.

A finite element method (FEM) may be preferred. In particular, a finite element method (FEM) can be implemented as a particular numerical method for solving partial differential equations in two or three space variables. To solve a problem, the FEM may subdivide a large system into smaller, simpler parts that are called finite elements. This may be achieved by a particular space discretization in the space dimensions, which may be implemented by the construction of a mesh of the object, i.e. the numerical domain for the solution which has a finite number of points. The finite element method formulation of a boundary value problem may finally result in a system of algebraic equations. The method may approximate the unknown function over the domain. The simple equations that model these finite elements may then be assembled into a larger system of equations that models the entire problem.

Additionally or alternatively, a finite difference method (FDM) may be carried out which performs discretizations used for solving differential equations by approximating them with difference equations that finite differences approximate the derivatives. FDM may convert a linear ordinary differential equations or non-linear partial differential equations into a system of equations that can be solved by matrix algebra techniques.

Additionally or alternatively, a boundary element method (BEM) may be carried out which may be a numerical computational method of solving linear partial differential equations which have been formulated as integral equations. The integral equation may be regarded as an exact solution of the governing partial differential equation. The boundary element method attempts to use the given boundary conditions to fit boundary values into the integral equation, rather than values throughout the space defined by a partial differential equation. Once this is done, in a post-processing stage, the integral equation can then be used again to calculate numerically the solution directly at any desired point in the interior of the solution domain.

Additionally or alternatively, in a control volume method (CVM), a complete region may be subdivided into control volumes. Nodes may be located at the center of the control volumes. A statement of a conservation equation may be used to form difference equation, or the differential form of the conservation equation may be integrated over the control volume to form difference equation.

Additionally or alternatively, a random walk method may be carried out which may be considered as a mathematical object that describes a path that consists of a succession of random steps on a mathematical space, such as integers.

Particularly preferred may be the finite element analysis. However, also one or more of the other mentioned and/or further numerical analysis methods may be advantageously implemented, additionally or alternatively.

In an embodiment, the process comprises carrying out the initial separation method on the same sample separation apparatus, i.e. on the same instrument, on which the determined modified separation method is to be carried out subsequently. By taking this measure, exactly the individual particularities and device-specific properties of specifically the sample separation apparatus, for which the separation method is modified, can be considered.

In an embodiment, the process comprises carrying out—once or multiple times—the following sequence of steps, i.e. carrying out the modified separation method on the sample separation apparatus, detecting further sensor data at the sample separation apparatus during carrying out the modified separation method, and carrying out a further numerical analysis for determining a further modified separation method by changing at least one operation parameter of the modified separation method and by using the detected further sensor data. Descriptively speaking, the described modification of the operating parameters in connection with the separation method may be repeated iteratively once or multiple times. By a feedback loop, the output of a previous iteration may be used as an input of a determination so as to continuously improve or refine the modification of the separation method. Such an approach may allow for a continued optimization of the separation method.

In an embodiment, the process comprises further modifying the determined modified separation method for transferring the modified separation method to another sample separation apparatus. In terms of such a method transfer from one instrument to another one, a separation method (for instance an already modified separation method) developed for a specific sample separation apparatus may be modified in accordance with the device-specific particularities of another sample separation apparatus. In such an embodiment, the separation method developed on the first mentioned separation apparatus may be used as initial separation method for developing a modified separation method for the other sample separation apparatus. In other words, the concept of executing a separation method, detecting sensor data during such an execution, and carrying out a numerical analysis considering the results of the method execution as well as detected sensor data may be advantageously used for the purpose of a method transfer from one instrument to another. In particular, this method transfer may be accomplished under consideration of device-specific particularities of at least one of the sample separation apparatus and the other sample separation apparatus, preferably of both.

In an embodiment, the process comprises determining information indicative of a robustness of the modified separation method against variations of the at least one operation parameter and/or against variations of at least one other physical parameter. By simulations, in particular carried out in the context of the numerical analysis, an impact of a fluctuation or drift of one or more operation parameters (for instance pressure fluctuations or temperature drift) on the separation results may be analyzed. The smaller the impact is, the higher is the robustness of the separation method, and vice versa.

In an embodiment, the process comprises modifying the initial separation method for enhancing robustness of the modified separation method against variations of the at least one operation parameter and/or against variations of at least one other physical parameter. Hence, a boundary condition of the modification of the separation method may be that parameters or parameter sets reducing robustness (for instance resulting in a robustness indicator falling below a predefined threshold value) will be rejected, whereas modified parameters or parameter sets increasing robustness (for instance resulting in a robustness indicator about a predefined threshold value) will be accepted. By taking this measure, separation methods which are highly vulnerable with respect to parameter variations and may thus likely lead to a significant instability in the event of parameter changes may be ruled out.

In an embodiment, the process comprises extracting at least one sample parameter being indicative of a property of the fluidic sample based on the initial separation method, the sensor data, and optionally a result of carrying out the initial separation method on the sample separation apparatus, and determining the modified separation method under consideration of the extracted at least one sample parameter. During extraction of parameters, it may be assessed or simulated how a fluidic sample reacts on real experimental conditions, such as pressure, temperature or solvent composition. On this basis, one more parameters may be extracted, for instance by interpolation or extrapolation. The extracted parameters may be properties of the analyte or fluidic sample.

In an embodiment, the process comprises determining the initial separation method by receiving a target specification from a user being indicative of a target of a sample separation task, searching for the initial separation method in a method database, which includes a plurality of reference separation methods, and selecting the initial separation method from the reference separation methods based on the received target specification. Preferably, this selection may be made in accordance with a best match with the received target specification. In other words, the reference method showing the best match with the user-defined target specification may be selected as the initial separation method. According to such an embodiment, a reliable, fast and resource-saving system for machine-assisted determination of a meaningful initial separation method may be provided. A user who wants to perform a certain sample separation task (for example, separation and quantitative characterization of two substances of an orange juice sample) can enter the desired separation task or the desired separation target in the form of a user-defined target specification to the method development system. This target specification can then be compared with an archive of many available historical separation methods in order to select an initial separation method from the method database, which, in view of the user-defined target specification, can be seen as a promising starting point for the modified separation method to be developed.

In an embodiment, the process comprises searching in the method database for a plurality of candidate separation methods as candidates for the initial separation method, selecting the candidate separation methods from the reference separation methods based on the received target specification, carrying out the process as described above (i.e.

method execution, detection of sensor data and carrying out a numerical analysis) for each of the selected candidate separation methods, and selecting one of the candidate separation methods as the initial separation method based on a match between a result of carrying out the candidate separation methods on the sample separation apparatus and the target specification. In such a preferred embodiment, the quality of the initial separation method used as a basis for developing the modified separation method may be further improved by making a pre-selection—for instance based on best matches of the reference methods in the method database with the user-defined target specification—of multiple candidate separation methods from the method database. Each selected candidate method can then be executed on a sample separation apparatus in an actual experiment or sample separation run. The results of these practical experiments with the candidate methods can then be used as a basis for a decision which of the candidate methods is actually used as initial separation method which, in turn, defines a starting point for developing a modified separation method. In this way, a meaningful pre-selection can be made taking into account the broad knowledge in the form of a large method database in a technically simple way by extraction a small number of candidate methods, which is specifically tailored to the user-defined target specification. Next, a real practical test of the small number of candidate methods (for instance 3 to 15, in particular 6 to 10, preferably about 8) can be carried out by actually checking it on the sample separator for compatibility with the user-defined target specification. On the basis of the experimental finding, a well-founded selection of a meaningful initial separation method may be made.

In an embodiment, the process comprises carrying out a gradient run according to the initial separation method on the sample separation apparatus. During a gradient run, a solvent composition of mobile phase pumped through a separation path of the sample separation apparatus may be continuously varied. This variation may trigger a desorption—subsequently and individually for different sample fractions—of the fluidic sample which has been previously adsorbed at a sample separation unit such as a chromatographic column. Thus, in an embodiment, the process comprises carrying out the initial separation method on a sample separation apparatus in a gradient mode wherein a composition of the mobile phase is varied over time; and detecting sensor data at the sample separation apparatus during carrying out the initial separation method, wherein the sensor data being indicative of the composition of the mobile phase flowing through the sample separation apparatus during carrying out the initial separation method on the sample separation apparatus.

Embodiments of the invention may be implemented in conventionally available HPLC systems, such as the Agilent 1200 (or 1290) Series Rapid Resolution LC system or the Agilent 1150 HPLC series (both provided by the applicant Agilent Technologies—see the website www.agilient.com.

One embodiment of a sample separation apparatus comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus preferably comprises a chromatographic column (see for instance the webpage en.wikipedia.org/wiki/Column_chromatography) providing a stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilient.com.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
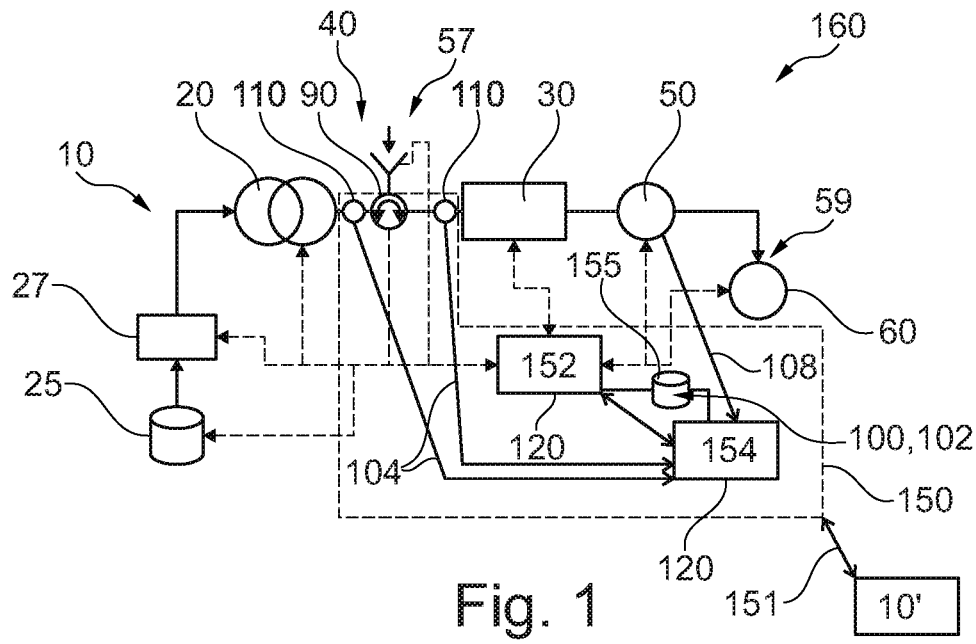
FIG. 1 shows a liquid sample separation apparatus in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

Conventionally, method development is done with a usually large, orthogonal set of chromatographic methods in the experiment space. The best result is taken as the optimized method. This method is then valid for the system in use. Conventionally, the whole experimental space has to be scanned with many experiments. The optimum method is only one of the done methods, not the global optimum. The found optimum is only valid for the sample separation apparatus used, poorly transferable to other sample separation apparatuses.

According to an exemplary embodiment of the invention, one or more separation methods may be run with a sensor, for instance located between a fluid drive unit (such as a pump) on the one hand and an injector, a sample separation unit (such as a column) or a detector on the other hand, in particular for measuring the real solvent composition. After one or a few initial experiments, results of the whole experimental space may be calculated and/or simulated, in particular by carrying out a numerical analysis. By taking this measure, the number of experiments involved in method development or separation may be greatly reduced. An improved or even optimum separation method can thus be found by calculation in the experimental space. The found method can be transferred to and re-calculated for any other sample separation apparatus with a single analytical run or even none. Optionally but advantageously, robustness of the developed or transferred separation method can be calculated.

Starting point of a process according to an exemplary embodiment of the invention may be the execution of an initial separation method (which may be a candidate separation method being a candidate for an appropriate separation method to be developed for a sample separation apparatus) on a certain sample separation apparatus. Thereafter, an improvement (for instance an optimization) of said initial separation method may be determined, for instance by a simulation or another kind of numerical analysis. Highly advantageously, an exemplary embodiment of the invention implements at least one method development sensor (preferably arranged upstream of a column head of a chromatographic separation column as an example for a sample separation unit) and uses sensor data as a basis of an improvement of the initial separation method to provide a modified separation method for the target sample separation apparatus. For instance, such a method development sensor may measure a composition for mobile phase (in particular a solvent composition, which may for instance comprise water as a first solvent and an organic solvent as a second solvent). If processes at the drive unit and/or at the separation unit are known and/or are detected, a modification or even optimization of the separation method may become possible. In particular, the at least one method development sensor may provide information which real or actual solvent composition is actually delivered by the drive unit. This real or actual solvent composition may differ from a theoretical or target solvent composition which may be defined by a separation method. Highly advantageously, at least one method development sensor may be arranged (preferably directly) upstream of the sample separation unit so that the sensor data is indicative of the actual solvent composition specifically at the position where sample separation occurs. For instance, the at least one method development sensor may provide a (volumetric and/or mass) flow rate and/or a (volumetric and/or mass) flow amount of mobile phase flowing towards the sample separation unit. Advantageously, a Coriolis sensor and/or a thermal flow sensor may be implemented as method development sensor(s).

Referring now in greater detail to the drawings, FIG. 1 depicts a general schematic of a liquid separation system as example for a sample separation apparatus 10 according to an exemplary embodiment of the invention. A fluid drive 20 (such as a piston pump) receives a mobile phase from a solvent supply 25 via degassing unit 27, which degases and thus reduces the amount of dissolved gases in the mobile phase. The fluid drive 20 drives the mobile phase through a separation unit 30 (such as a chromatographic column) comprising a stationary phase. A sampler or injector 40, implementing a fluidic valve 90, can be provided between the fluid drive 20 and the separation unit 30 in order to subject or add (often referred to as sample introduction) a sample fluid into the mobile phase at reference sign 57 so that a fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid. It is also possible to provide a waste at reference sign 59.

While the mobile phase can be comprised of one solvent only, it may also be mixed from plural solvents. Such mixing may be a low pressure mixing and provided upstream of the fluid drive 20, so that the fluid drive 20 already receives and pumps the mixed solvents as the mobile phase. Alternatively, the fluid drive 20 may comprise plural individual pumping units, with plural of the pumping units each receiving and pumping a different solvent or mixture, so that the mixing of the mobile phase (as received by the separation unit 30) occurs at high pressure and downstream of the fluid drive 20 (or as part thereof). The composition of the mobile phase may be kept constant over time, the so called isocratic mode, or varied over time, the so called gradient mode.

A data processing unit or control unit 152, which can be a PC or workstation and which may comprise one or more processors 120, may be coupled (as indicated by the dotted arrows) to one or more of the devices in the sample separation apparatus 10 in order to receive information and/or control operation. For example, the control unit 152 may control operation of the fluid drive 20 (for example setting control parameters) and receive therefrom information regarding the actual working conditions (such as output pressure, etc. at an outlet of the pump). Optionally, the control unit 152 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 152 may further control operation of the sampling unit or injector 40 (for example controlling sample injection or synchronization of sample injection with operating conditions of the fluid drive 20). The separation unit 30 may also be controlled by the control unit 152 (for example selecting a specific flow path or column, setting operation temperature, etc.), and send—in return—information (for example operating conditions) to the control unit 152. Accordingly, the detector 50 may be controlled by the control unit 152 (for example with respect to spectral or wavelength settings, setting time constants, start/stop data acquisition), and send information (for example about the detected sample compounds) to the control unit 152. The control unit 152 may also control operation of the fractionating unit 60 (for example in conjunction with data received from the detector 50) and provide data back.

For operating sample separation apparatus 10 according to FIG. 1 in accordance with a desired separation task (for instance the separation of a specific sample in a specific way), a corresponding separation method needs to be developed for or transferred from another sample separation apparatus to the sample separation apparatus 10.

For this purpose, an arrangement 160 according to an exemplary embodiment of the invention may be used. Said arrangement 160 is composed of the sample separation apparatus 10 according to FIG. 1 and further comprises a device 150 for determining a modified separation method 102 based on an initial separation method 100 and for providing the modified separation method 102 to the sample separation apparatus 10 for execution as a given separation method.

The device 150 may be equipped with one or more processors 120 for determining a modified separation method 102 matching with the needs of the sample separation apparatus 10 based on an initial separation method 100, for instance a pre-known separation method. The modified separation method 102 may be developed for execution specifically on the sample separation apparatus 10 shown in FIG. 1.

More specifically, the device 150 may comprise at least part of the above-described control unit 152 (or a separate control unit or processor 120) for carrying out or controlling the initial separation method 100 on the sample separation apparatus 10. In other words, an actual sample separation run is carried out on the sample separation apparatus 10 using the initial separation method.

Furthermore, the device 150 may comprise one or more sensors 110 which may be arranged along a separation path along which a fluidic sample flows during the separation process. The sensors 110 may sense sensor data 104. In particular, the one of more sensors 110 may be configured for sensing fluid-specific data, i.e. sensor data being related to the mobile phase driven through conduits of the sample separation apparatus 10 and/or the fluidic sample to be separated by the sample separation apparatus 10. For example, sensor(s) 110 may comprise or consist of one or more pressure sensors for detecting a pressure of mobile phase and/or fluidic sample and/or may comprise or consist of one or more flow sensors detecting a flow rate (for instance a mass flow rate, i.e. fluidic mass flowing per time unit, or a volumetric flow rate, i.e. a fluidic volume flowing per time unit) of mobile phase and/or fluidic sample. The one or more sensors 110 may be configured for detecting sensor data 104 at the sample separation apparatus 10 during carrying out the initial separation method 100. The detected sensor data may be stored in a database 155 (such as a mass storage device), in which also data related to the separation methods 100, 102 and/or data related to a below described numerical analysis may be stored.

Moreover, the device 150 further comprises a numerical analysis unit 154, which may be embodied for instance as one or more processors 120. The numerical analysis unit 154 may be configured for carrying out a numerical analysis (for instance a finite element analysis) for determining a modified separation method 102 for the sample separation apparatus 10 by modifying or changing one or more operation parameters (such as pressure values, flow rate, composition of mobile phase of one or more solvents, column temperature, shape and parameters of a gradient profile, etc.) of the initial separation method 100. Furthermore, the numerical analysis carried out for determining a modified separation method may take into account the detected sensor data 104 as an additional item of information. Beyond this, the numerical analysis may also consider a separation result obtained by carrying out the initial separation method 100 on the sample separation device 10, for instance a chromatogram. Thus, the numerical analysis unit 154 may carry out the numerical analysis using a result 108 of carrying out the initial separation method 100 (such as a chromatogram) as detected by detector 50 and optionally further processed by control unit 152. Thereby, the actual or real behavior of the sample separation apparatus 10, which may deviate or differ from a target behavior, may be considered for the adjustment of the modified separation method 102 as well.

As indicated in FIG. 1 as well, device 150 (and in particular numerical analysis unit 154) may be communicatively coupled or couplable by a communication link 151 with another (or second) sample separation apparatus 10'. In order to adapt the modified separation method 102 developed for the (first) sample separation apparatus 10 to the further (or second) sample separation apparatus 10', the device 150 (and/or a corresponding device in sample separation apparatus 10', not shown) may be configured for further modifying the determined modified separation method 102 for transferring the modified separation method 102 to the other (or second) sample separation apparatus 10'.

This may be accomplished in a similar way as described above for the (first) sample separation apparatus 10 with the precaution that, for this method transfer, the modified separation method 102 developed for the (first) sample separation apparatus 10 may be used as initial separation method serving as the basis for the development of a further (or second) modified sample separation method for the further (or second) sample separation apparatus 10'.

For developing a separation method for sample separation apparatus 10, a starting point of the development may be the initial separation method 100 executed on the sample separation apparatus 10. The sensors 110 may deliver to control unit 152 sensor information about the actual separation conditions which may differ from a target condition as defined by the initial separation method 100. Based on a separation result 108 (as provided by detector 50, obtained by carrying out the initial separation method 100 on the sample separation apparatus 10) and the provided sensor data 104, a numerical analysis may be carried out by numerical analysis unit 154. During said numerical analysis, operation parameters as defined by the initial separation method 100 may be modified for determining an improved or even optimized modified separation method 102 as a development result. Optionally, the modified separation method 102 may be transferred to the further sample separation apparatus 10' by using the modified separation method 102 (developed for sample separation apparatus 10) as initial separation method for the further sample separation apparatus 10' and performing the above mentioned method execution, sensing and execution of a numerical analysis.

Figure 2:
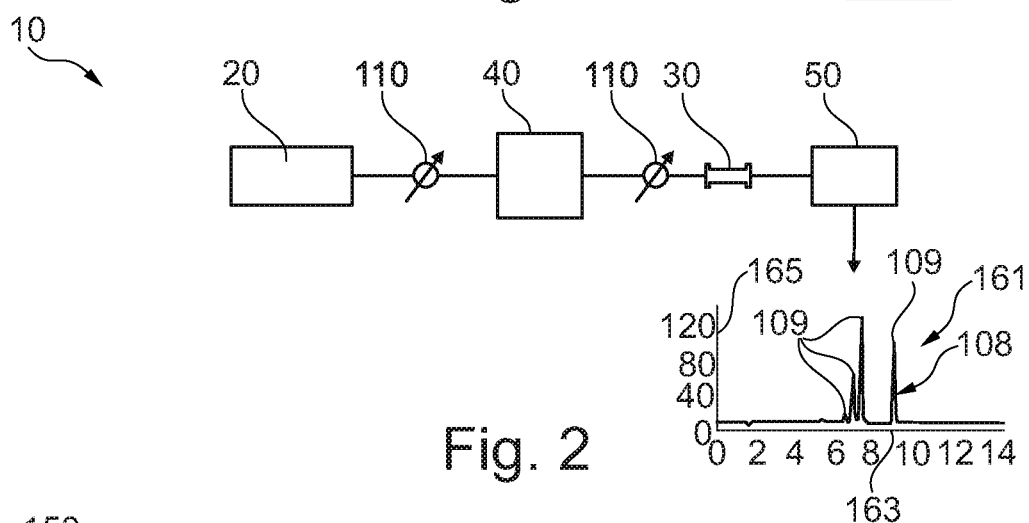
FIG. 2 shows part of an arrangement for determining a modified separation method for a sample separation apparatus based on an initial separation method according to an exemplary embodiment.
Figure 3:
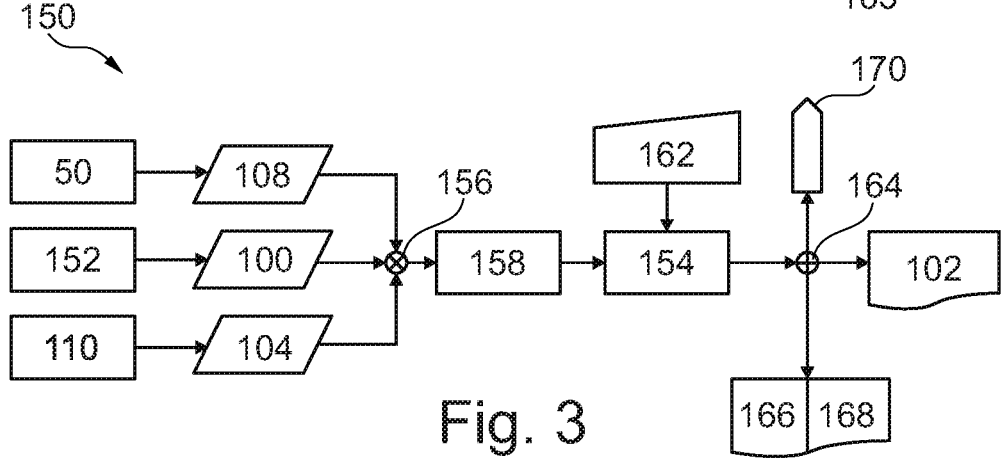
FIG. 3 shows another part of an arrangement for determining a modified separation method for a sample separation apparatus based on an initial separation method according to an exemplary embodiment.
Figure 4:
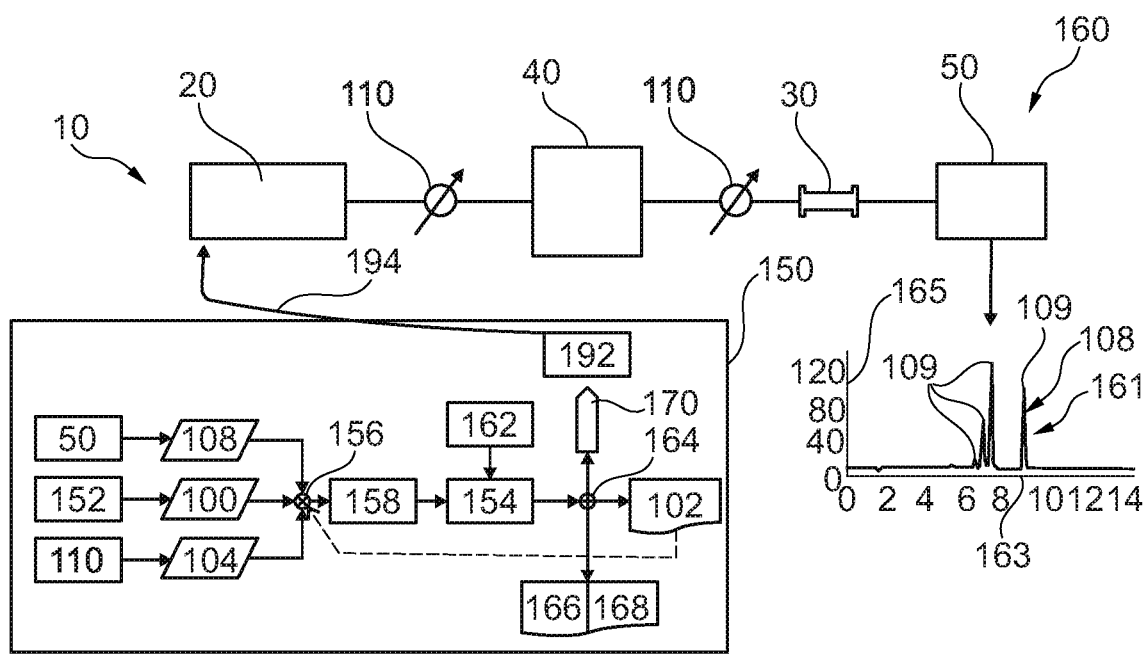
FIG. 4 shows the arrangement with the parts of FIG. 2 and FIG. 3 for determining a modified separation method for a sample separation apparatus based on an initial separation method with feedback loop according to an exemplary embodiment.

FIG. 2 shows part of an arrangement 160 for determining a modified separation method 102 for a sample separation apparatus 10 based on an initial separation method 100 according to an exemplary embodiment. The part shown in FIG. 2 is substantially the separation and detection path of sample separation apparatus 10 according to FIG. 1. FIG. 3 shows another part of said arrangement 160, i.e. substantially the constituents of device 150 together with a sequence of procedures carried out using such a device 150. FIG. 4 shows the entire arrangement 160 with the parts of FIG. 2 and FIG. 3 and with a feedback loop 194 for obtaining an iterative method improvement according to an exemplary embodiment.

As already mentioned, FIG. 2 illustrates the separation and detection path from fluid drive unit 20 (such as an HPLC pump) via a first sensor 110, an injector 40 (such as an HPLC injector), a further (or second) sensor 110 and a sample separation unit 30 (such as a chromatographic column) up to detector 50 (for instance a fluorescence detector) where a chromatogram 108 may be detected. Chromatogram 108 is shown in a diagram 161 having an abscissa 163 along which the time is plotted, whereas along an ordinate 165 of said diagram 161, detector signals are plotted. FIG. 2 shows that the chromatogram 108 includes a plurality of peaks 109, each corresponding to a respective fraction of the separated fluidic sample. For instance, the shown sensors 110 may be composition sensors for sensing a composition of mobile phase and may be present at one or both of the shown positions, and preferably upstream of the sample separation unit 30. Correspondingly, a process carried out by device 150 may use the sensors 110 for detecting sensor data 104 indicative of a flow rate, a composition, a temperature and/or a pressure of a mobile phase flowing through the sample separation apparatus 10 during carrying out the initial separation method 100 on the sample separation apparatus 10. In particular, the sensor data 104 may be detected by the one or more method development sensors 110 located preferably upstream of sample separation unit 30 of the sample separation apparatus 10. More specifically, one (or a first) method development sensor 110 is located between fluid drive 20 for driving a mobile phase and injector 40 for injecting the fluidic sample in the mobile phase. A further (or second) method development sensor 110 may be located between the injector 40 for injecting the fluidic sample in the mobile phase and the sample separation unit 30 which actually separates the fluidic sample into fractions.

The device 150 illustrated in FIG. 3 receives as input from detector 50 the result 108 of executing initial separation method 100 (used as a starting point for the method development, improvement, optimization or transfer). For instance, a gradient run according to the initial separation method 100 on the sample separation apparatus 10 may be carried out. The initial separation method 100 may be carried out on the same sample separation apparatus 10 on which the determined modified separation method 102 is subsequently carried out after having completed determination of modified separation method 102. A further input to device 150 is said initial separation method 100 (i.e. a parameter set as a recipe for carrying out the sample separation) and is obtained from control unit 152 (having access to database 155). Yet another input to the device 150 is the sensor data 104 as sensed by the one or more method development sensors 110. Descriptively speaking, the result 108 indicates how the theoretically defined initial separation method 100 has in fact acted on the sample separation apparatus 10 and which real result 108 has been obtained. In contrast to this, the further input initial separation method 100 describes an intention as to how the sample separation task shall be carried out ideally in terms of the definition of a target or goal.

At a collection unit 156, the three mentioned inputs are collected or combined, i.e. may be considered in combination for creating a modified separation method 102 (obtained as an output of device 150). At a parameter extraction unit 158, one or more parameters are extracted indicating how the analytes (in particular the fluidic sample to be separated) react on the real conditions (in particular in terms of pressure, temperature, solvent, peak height, etc.) in the sample separation apparatus 10. The parameter extraction unit 158 may receive the inputs collected by collection unit 156. Descriptively speaking, said one or more extracted parameters may be extracted on the basis of said real conditions derived from the separation result 108 and the sensor data 104. For instance, parameter extraction may be accomplished by interpolation, extrapolation and/or other mathematical or statistical methods. Thus, it may be possible to extract one or more sample parameters being indicative of a property of the fluidic sample based on the initial separation method 100, the sensor data 104, and (optionally but preferably) the result 108 of carrying out the initial separation method 100 on the sample separation apparatus 10. Preferably, the modified separation method 102 may be determined under consideration of the extracted at least one sample parameter.

Numerical analysis unit 154 may receive as an input the one or more extracted parameters from the parameter extraction unit 158. As a further input, numerical analysis unit 154 receives one or more optimal method criteria provided by a criteria provision unit 162. Criteria provision unit 162 may provide said at least one criterion on the basis of a user input, i.e. a user may define one or more target criteria which a developed modified separation method 102 shall fulfill, for instance in view of a separation task a user wants to carry out. On the basis of the one or more optimal method criteria and the one more extracted parameters, numerical analysis unit 154 may carry out a numerical analysis, for instance a finite element (FE) simulation. For instance, the numerical analysis unit 154 may be configured for carrying out a finite element simulation and may model the sample separation apparatus 10 (for instance an HPLC). The numerical analysis unit 154 may then simulate how variations of one or more operation parameters (such as pressure values, flow rates, temperature values, composition of fluidic sample and mobile phase, etc.) affect a separation result. Additionally or alternatively, the numerical analysis carried out by numerical analysis unit 154 may be a finite difference method (FDM) analysis, a boundary element method (BEM) analysis, a control volume method (CVM) analysis and/or a random walk method analysis. The output of the numerical analysis may be information concerning a modified separation method 102 accelerating the separation and/or rendering the separation more precise or accurate.

A determination unit 164 may determine the modified separation method 102 on the basis of the result of the numerical analysis.

Furthermore, the determination unit 164 may further process results of the numerical analysis for accomplishing a method transfer (indicated schematically by the reference sign 166) to another sample separation apparatus 10'. For such a method transfer, the modified separation method 102 may be further modified, for instance in such a way that the further modified separation method achieves the same results on the further sample separation apparatus 10' as if the modified separation method 102 were executed on sample separation apparatus 10.

Apart from this, the determination unit 164 may further process results of the numerical analysis for assessing (in particular quantifying) robustness of the modified separation method 102, see block 168. Robustness of a separation method may be defined as a capability of a separation method to achieve the same or a substantially stable separation result as desired or expected even when one or more operation parameters change or fluctuate. For instance, robustness may be assessed in terms of temperature changes of a sample separation unit 30 and/or in terms of operation of drive unit 20 differing from a target operation. Also a degree of pressure fluctuations within a sample separation apparatus may provide information about the robustness of a modified separation method 102. More generally, it may be possible to determine the robustness of the modified separation method 102 against variations of the at least one operation parameter and/or against variations of at least one other physical parameter. In particular, determination unit 164 may be configured for modifying the initial separation method 100 for enhancing robustness of the modified separation method 102 against variations of the at least one operation parameter and/or against variations of at least one other physical parameter. For this purpose, the modified separation method 102 may be tested by the determination unit 164, for instance by carrying out simulations, concerning the behavior of the modified separation method 102 in the event of changes or fluctuations of one or more operation parameters. Method modifications resulting in a sufficient or even increased robustness may be accepted, whereas other method modifications resulting in a reduction of robustness may be refused or rejected.

The result of the described analysis may also be used for a next or new experimental separation method to be designed, as indicated schematically by reference sign 170.

Advantageously, device 150 may carry out, once or multiple times, the sequence of steps of carrying out the modified separation method 102 on the sample separation apparatus 10, detecting further sensor data at the sample separation apparatus 10 during carrying out the modified separation method 102, and carrying out a further numerical analysis for determining a further modified separation method by changing at least one operation parameter of the modified separation method 102 and by using the detected further sensor data 104. In other words, the creation of a modified separation method 102 may be an iterative process, carried out by an iteration unit 192. As shown, the iterative process may involve a feedback loop 194 which may be repeated once or multiple times. Thereby, the quality of the modified separation method 102 may be continuously improved.

Figure 5:
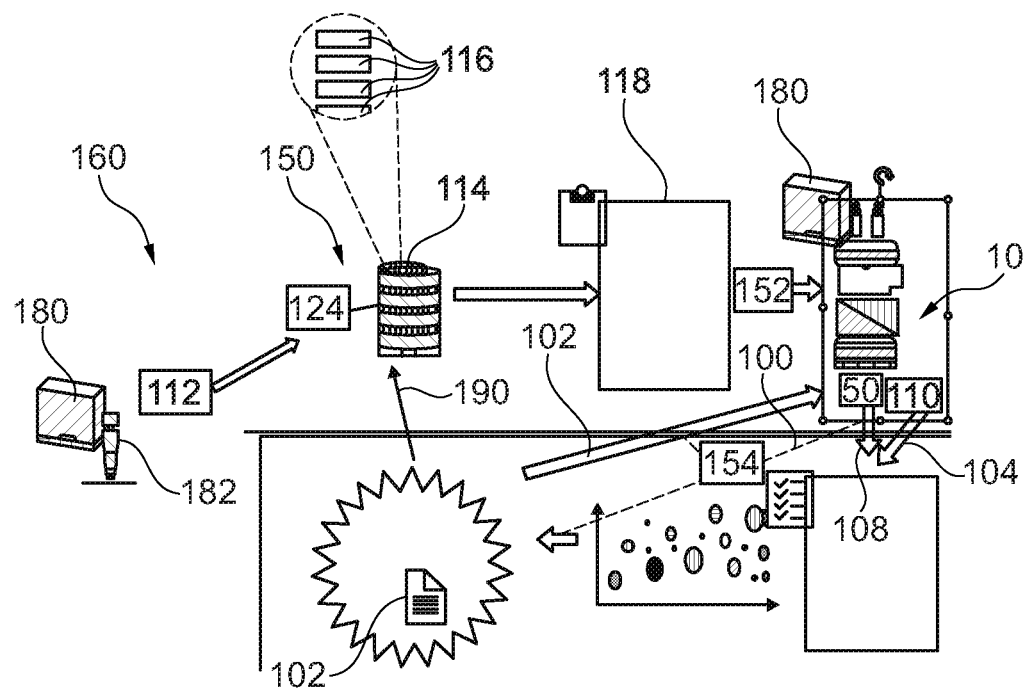
FIG. 5 shows an arrangement for developing a separation method according to an exemplary embodiment.

FIG. 5 shows an arrangement 160 for developing a modified separation method 102 according to an exemplary embodiment.

In a nutshell, the arrangement 160 may firstly determine an initial separation method 100 by receiving a target specification 112 from a user being indicative of a target of a sample separation task. Thereafter, it may be possible to search for the initial separation method 100 in a method database 114 which includes a plurality of reference separation methods 116. Each of the reference separation methods 116 may correspond to an assigned data set in method database 114. The initial separation method 100 may be selected from the reference separation methods 116 based on the received target specification 112. Thus, a meaningful initial separation method 100 may be extracted from method database 114 for instance by looking for a best match between the user-defined target specification 112 for a desired separation task and one of the pre-known reference separation methods 116 stored in the method database 114.

Most preferably, the arrangement 160 may search in the method database 114 for a plurality of candidate separation methods 118 as candidates for the initial separation method 100. The candidate separation methods 118 are a subset of the reference separation methods 116. The functionality of the arrangement 160 may select the candidate separation methods 118 from the reference separation methods 116 based on the received target specification 112, and may carry out the process described above (i.e. executing the respective candidate separation method 118 on the sample separation apparatus 10, detecting sensor data during execution of the respective candidate separation method 118, as well as execution of a numerical analysis or simulation using the detected sensor data and modifying operation parameters) for each of the selected candidate separation methods 118. Thereafter, it may be possible to select one of the candidate separation methods 118 as the initial separation method 100 based on a match between a result 108 of carrying out a respective one of the candidate separation methods 118 on the sample separation apparatus 10 and the target specification 112.

This concept will be described in the following in further detail referring to FIG. 5:

A user or an institution associated with the user is shown in FIG. 5 with reference sign 180. The user or institution operates a sample separation apparatus 10, for which a separation method is to be developed in order to achieve a specific separation target.

As shown in FIG. 5, a user-defined target specification 112 is provided by the user via an input interface, which specifies a desired separation of a schematically represented fluidic sample 182. As a basis for the method development, the user can specify, for example, which components of the fluidic sample 182 should be resolved. In addition, it can be indicated in the context of the user-defined target specification 112 whether the sensitivity of the sample separation is relevant. Thus, a desired accuracy of sample separation can be defined. Also a desired analysis time can be defined in the framework of the user-defined target specification 112.

The user-defined target specification 112 can be transmitted to the method database 114 (which may be stored in a cloud) or to search unit 124. The reference separation methods 116 stored in the method database 114 can be provided from historical use cases, publications, libraries, pharmaceutical databases, etc.

The search unit 124 may query the individual reference separation methods of the method database 114 in relation to the user-defined target specification 112 and may pre-select a subset of the reference separation methods 116 that can be used as selected candidate methods 118. Each of the said candidate methods 118 can provide information regarding solvent composition, a gradient profile, a column type, a column temperature, etc. Selection criteria for selecting a subset of candidate methods 118 from the method database 114 can be a highest similarity with the fluidic sample, the separation target and/or one or more operation parameters (such as temperature, solvent, column, buffer and pressure) of the user-defined target specification 112.

Controlled by the control unit 152 of the device 150, the sample separation apparatus 10 can be operated to execute successively each of the (for example 8) selected candidate methods 118 on exactly the sample separation apparatus 10 (at the place of the user or the user institution, which is represented with reference sign 180) for which the separation method is developed. The sample separation apparatus 10 is thus occupied only for a maximum of one day with the execution of the candidate methods 118 in the context of method development. In contrast to this, conventional sample development typically requires a period of one to two weeks.

One of the candidate methods 118, for instance a best matching one, may then be selected as initial separation method 100. The selection of the initial separation method 100 from the pre-selected candidate separation methods 118 may be carried out on the basis of a result of the execution of the candidate separation methods 118 on the sample separation device 10.

Subsequently, the identified or selected initial separation method 100 can be made subject to a schematically illustrated simulation or computer-based improvement by numerical analysis unit 154, which may be configured for carrying out a simulation or method optimization. In one embodiment, said determination of modified separation method 102 may be based on initial separation method 100 and can be carried out as described above referring to FIG. 1 to FIG. 4. In particular, one or more operating parameters of a respective separation method can be modified on a simulation basis in order to further improve the separation method. Modified operating parameters can include in particular the separation conditions (in particular pressure and/or temperature), a used sample separation apparatus, a used temperature of the sample separation apparatus, a wavelength of a detector, integration parameters, etc. Furthermore, captured sensor data 104 may be taken into account when the initial separation method 100 is executed on sample separation apparatus 10 for determining modified separation method 102.

The result of the described procedure may then be the receipt of a modified separation method 102, which is submitted to the user as a proposal and/or the sample separation apparatus 10 for execution.

As represented with reference sign 190, the fully developed modified separation method 102 can also be stored in the method database 114 in order to enrich the method database 114 with additional data. The fully developed modified separation method 102 can then also be used for the future development of other separation methods.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A process of determining a modified separation method for a sample separation apparatus based on an initial separation method, the process comprising:
   carrying out the initial separation method on a sample separation apparatus by flowing a mobile phase through the sample separation apparatus in a gradient mode wherein a composition of the mobile phase is varied over time, and injecting a fluidic sample into the mobile phase, wherein the sample separation apparatus separates different components of the fluidic sample while the fluidic sample flows with the mobile phase;
   detecting sensor data at the sample separation apparatus during carrying out the initial separation method, wherein the sensor data is indicative of the composition of the mobile phase flowing through the sample separation apparatus during carrying out the initial separation method on the sample separation apparatus; and
   carrying out a numerical analysis for determining the modified separation method by modifying at least one operation parameter of the initial separation method and by using the detected sensor data.

2. The process according to claim 1, wherein the process comprises determining the initial separation method by:
   receiving a target specification from a user being indicative of a target of a sample separation task;
   searching for the initial separation method in a method database, which includes a plurality of reference separation methods; and
   selecting the initial separation method from the reference separation methods based on the received target specification, or based on the received target specification in accordance with a best match with the received target specification.

3. The process according to claim 2, wherein the process comprises:
   searching in the method database for a plurality of candidate separation methods as candidates for the initial separation method;
   selecting the candidate separation methods from the reference separation methods based on the received target specification;
   carrying out each of the selected candidate separation methods on the sample separation apparatus; and
   selecting one of the candidate separation methods as the initial separation method based on a match between a result of carrying out the candidate separation methods on the sample separation apparatus and the target specification.

4. The process according to claim 1, wherein the process comprises one of:
   carrying out the numerical analysis using a result of carrying out the initial separation method;

carrying out the numerical analysis using a result of carrying out the initial separation method, wherein the result comprises a chromatogram.

5. The process according to claim 1, wherein the process comprises detecting sensor data indicative of at least one selected from the group consisting of:
- a flow rate of the mobile phase flowing through the sample separation apparatus during carrying out the initial separation method on the sample separation apparatus;
- a temperature of the mobile phase and/or the fluidic sample flowing through the sample separation apparatus during carrying out the initial separation method on the sample separation apparatus; and
- a pressure of the mobile phase flowing through the sample separation apparatus during carrying out the initial separation method on the sample separation apparatus.

6. The process according to claim 1, wherein the process comprises detecting the sensor data by at least one sensor located at a location according to at least one of:
- upstream of a sample separation unit of the sample separation apparatus, wherein the sample separation unit is configured to separate the different components of the fluidic sample;
- upstream of a sample separation unit of the sample separation apparatus, and between a fluid drive and an injector of the sample separation apparatus, wherein the sample separation unit is configured to separate the different components of the fluidic sample, the fluid drive is configured to drive the flowing of the mobile phase, and the injector is configured to inject the fluidic sample into the mobile phase;
- between an injector and a sample separation unit of the sample separation apparatus, wherein the injector is configured to inject the fluidic sample into the mobile phase, and the sample separation unit is configured to separate the different components of the fluidic sample.

7. The process according to claim 1, wherein the process comprises carrying out the numerical analysis using at least one selected from the group consisting of: a finite element method analysis; a finite difference method analysis; a boundary element method analysis; a control volume method analysis; and a random walk method analysis.

8. The process according to claim 1, wherein the process comprises carrying out the initial separation method on the same sample separation apparatus on which the determined modified separation method is to be carried out subsequently.

9. The process according to claim 1, wherein the process comprises carrying out once or multiple times the following sequence:
- carrying out the modified separation method on the sample separation apparatus;
- detecting further sensor data at the sample separation apparatus during carrying out the modified separation method; and
- carrying out a further numerical analysis for determining a further modified separation method by modifying at least one operation parameter of the modified separation method and by using the detected further sensor data.

10. The process according to claim 1, wherein the process comprises one of:
- further modifying the modified separation method determined for the sample separation apparatus for transferring the modified separation method to another sample separation apparatus;
- further modifying the modified separation method determined for the sample separation apparatus for transferring the modified separation method to another sample separation apparatus, under consideration of device-specific particularities of at least one of the sample separation apparatus and the other sample separation apparatus.

11. The process according to claim 1, wherein the process comprises determining information indicative of a robustness of the modified separation method against variations of the at least one operation parameter and/or against variations of at least one other physical parameter.

12. The process according to claim 1, wherein the process comprises modifying the initial separation method for enhancing robustness of the modified separation method against variations of the at least one operation parameter and/or against variations of at least one other physical parameter.

13. The process according to claim 1, wherein the process comprises:
- extracting at least one sample parameter being indicative of a property or behavior of the fluidic sample based on the initial separation method and the sensor data, or additionally based on a result of carrying out the initial separation method on the sample separation apparatus; and
- determining the modified separation method under consideration of the extracted at least one sample parameter.

14. A non-transitory computer-readable medium with instructions stored thereon, that when executed by a processor, carry out or control the process according to claim 1.

15. A program element for determining a modified separation method for a sample separation apparatus based on an initial separation method, wherein the program element, when being executed by one or a plurality of processors, is configured to carry out or control the process according to claim 1.

16. A device for determining a modified separation method for a sample separation apparatus based on an initial separation method, the device comprising:
- a control unit for carrying out the initial separation method on a sample separation apparatus;
- at least one sensor for detecting sensor data at the sample separation apparatus during carrying out the initial separation method; and
- a numerical analysis unit for carrying out a numerical analysis for determining the modified separation method by modifying at least one operation parameter of the initial separation method and by using the detected sensor data.

17. An arrangement, comprising:
- a sample separation apparatus for separating a fluidic sample, wherein the sample separation apparatus comprises:
  - a fluid drive for driving a mobile phase and the fluidic sample when injected in the mobile phase;
  - a sample separation unit for separating the fluidic sample in the mobile phase; and
  - a control unit configured for controlling the separation of the fluidic sample based on a given separation method; and
- the device according to claim 16 for determining a modified separation method based on an initial separation method and for providing the modified separation method to the sample separation apparatus as the given separation method.

18. The arrangement according to claim 17, wherein the sample separation apparatus comprises at least one of the following features:
- the sample separation apparatus is configured as a chromatography sample separation apparatus;
- the sample separation apparatus comprises a detector configured to detect separated fractions of the fluidic sample;
- the sample separation apparatus comprises a fractioner unit configured to collect separated fractions of the fluidic sample;
- the sample separation apparatus comprises an injector configured to inject the fluidic sample in the mobile phase.

* * * * *